United States Patent Office 3,188,314
Patented June 8, 1965

3,188,314
PREPARATION OF N,N'-HYDROCARBON
SUBSTITUTED HYDRAZINES
Howard V. Holler, Orinda, Calif., assignor to Shell Oil
Company, New York, N.Y., a corporation of Delaware
No Drawing. Filed Aug. 27, 1962, Ser. No. 219,718
6 Claims. (Cl. 260—293)

This invention relates to the preparation of allylic hydrazines. More particularly, the invention relates to the preparation of allylic hydrazines from certain tertiary allylic amines.

INTRODUCTION

Substituted hydrazines are useful in a variety of applications. As compounds, they are employed as reducing agents, particularly in photographic emulsions and developers, and as insecticides and softening agents for rubber. They are also effective as analgesics and antipyretics. In addition, they serve as intermediates in the preparation of such diverse items as dyes and biologically useful chemicals as drugs and pesticides. In general, however, substituted hydrazines, such as trialkylhydrazine, are difficult to prepare by direct alkylation because of the preferential formation of polysubstituted hydrazinium salts, e.g., 1,1,1-trialkyl hydrazinium chloride.

OBJECTS

It is an object of the present invention to provide a novel process for preparing unsaturated hydrazines. Another object of the invention is the provision of a process for preparing allylic hydrazines from allylic tertiary amines. The reaction of allylic tertiary amines with certain amines or their derivatives to afford allylic hydrazines is another object of the invention. Other objects will be apparent from the following detailed description of the invention.

STATEMENT

These objects are accomplished by the process which comprises reacting together an allylic tertiary amine and an amine of the formula

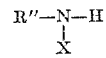

where X is a monovalent anion of a strong acid and R'' is hydrogen or a monovalent hydrocarbon radical selected from the group consisting of alkyl and aryl radicals, preferably of up to 8 carbon atoms, said reaction being conducted in basic liquid phase at a temperature between about 0° C. and about 150° C.

REACTANTS

By allylic tertiary amine is meant a tertiary monoamine having up to three allyl substituents, and when there are less than three allyl substituents, having the other valences on the nitrogen atom satisfied with saturated or aromatic hydrocarbon substituents. Preferably such hydrocarbon substituents are alkyl or phenyl groups of up to 8 carbon atoms. Such tertiary amines are those of the general structure

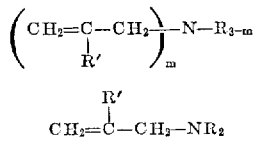

wherein R is alkyl, aryl or alkylene of up to 8 carbon atoms, $m$ is an integer from 1 to 3, and R' is hydrogen or lower alkyl of from 1 to 3 carbon atoms.

Exemplary of such tertiary amines are allyl dipropyl amine, diallyl methyl amine, triallyl amine, allyl dimethyl amine, diallyl ethyl amine, methallyl dioctyl amine, trimethallyl amine, dimethallyl pentyl amine, phenyl diallyl amine, diphenyl methallyl amine, and the like.

The amine with which the allylic tertiary amine described is reacted in the process of the invention is the amine of the formula

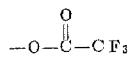

where R'' is hydrogen or a monovalent hydrocarbon radical free from olefinic or acetylenic unsaturation and preferably having up to 8 carbon atoms, and X is the monovalent cation of a strong acid. Thus, R'' may be hydrogen alkyl or aryl, e.g., methyl, ethyl, propyl, heptyl, cyclohexyl or the like, or it may be phenyl, tolyl, xylyl, benzyl, etc. Exemplary of X are such radicals as halides, the radical —OSO₃H, —OSO₂C₆H₅, $$-O-\overset{O}{\underset{\|}{C}}-CF_3$$

and the like. Preferred radicals are those anions of strong acids having a $pK_a$ equal to or greater than that of hydrofluoric acid.

Exemplary of such amines are the haloamines, such as chloramine, methyl chloramine, butyl chloramine, isopropyl chloramine, bromamine, phenyl chloramine, and the like; and sulfonic acids, including hydroxylamino-O-sulfonic acid, ethylhydroxylamino-O-sulfonic acid, phenylhydroxylamino-O-sulfonic acid, and the like.

PROCESS

The reactants are combined in any convenient proportions. While stoichiometric proportions are preferred, an excess of either amine may be employed, up to about 10 moles of one amine per mole of the other. The reaction is conducted in basic liquid phase, preferably in an anhydrous inert organic solvent. Typical solvents include such alkanols as methanol, ethanol, isopropanol, tert.-butanol, pentanol, cyclohexanol and the like; such ethers as diethyl ether, methyl ethyl ether, diisopropyl ether; dioxane; tetrahydrofuran; ethylene glycol monoethyl ether, and the like; and similar solvents. Polar solvents are preferred, although the reaction will also go in non-polar inert solvent.

The reaction is conducted in the presence of an amount of base at least equimolar to the tertiary allyl amine. Preferred bases are the alkali metal hydroxides, such as sodium or potassium hydroxide; the alkaline earth hydroxides, such as calcium or barium hydroxide. The corresponding carbonates, oxides, alkoxides, and the like may also be employed. If desired, merely an excess of tertiary amine may be used to afford a sufficiently basic reaction medium.

The amines are mixed in the basic solvent, and the reaction is conducted at a temperature between about 0° C. and about 150° C. Preferred temperatures are those between about 25° C. and 75° C.

PRODUCTS

The products of the reaction are those allylic hydrazines wherein the nitrogen atom of the non-allylic amine is directly attached to an allylic hydrocarbon substituent. Examples of such hydrazines include such triallylic hydrazines as triallyl hydrazine, trimethallyl hydrazine, and tri(ethallyl) hydrazine. Other typical hydrazine products include N-allyl-N',N'-pentamethylene hydrazine; N-allyl-N',N'-dimethyl hydrazine; N,N'-diallyl-N'-isopropyl hydrazine; N-crotyl-N',N'-dibutyl hydrazine; and the like.

The reaction appears to take place by going through a quaternary ammonium intermediate, formed under the particular conditions of the reaction. While the mechanism will be discussed in terms of the preferred embodiment of the process of the invention, it should be understood that the process will be applicable to any of the reactants described.

In the reaction of triallyl amine with chloramine, a quaternary triallyl ammonium chloride is formed $(CH_2=CH—CH_2)_3N + NH_2Cl \rightarrow$
$[(CH_2=CH—CH_2)_3N^+—NH_2]Cl^-$ which rearranges under basic conditions to afford triallyl hydrazine $(CH_2=CH—CH_2)_2—N—NH(CH_2—CH=CH_2)$ in high yield. The resulting product may be recovered by such conventional methods as fractional distillation, crystallization, extraction, or the like.

The novel products and process of the invention are further illustrated by the following specific examples. It should be understood, however, that these examples are merely illustrative and are not to be regarded as limitations on the appended claims. The basic teachings of the examples may be varied at will within the scope of the disclosure, as will be understood by one skilled in the art. In the examples, the proportions are expressed in parts by weight unless otherwise noted.

*Example I*

Two moles (274.4 grams) of triallyl amine were dissolved in 350 ml. of anhydrous methanol. To the resulting solution was added a solution of 0.4 mole (52 grams) of hydroxylamine-O-sulfonic acid in an equal volume of anhydrous methanol.

The mixture was warmed to about 40° C. and to it was added one mole (54 grams) of sodium methoxide in 300 ml. of warm methanol. The resulting mixture was vigorously shaken and distilled through a packed Vigreux column. In this way 42 grams (69% yield) of triallyl hydrazine was obtained. The product had a boiling point at 37 mm. of 85° C. and upon analysis gave the following data:

|  | Percent C | Percent H | Percent N |
|---|---|---|---|
| Theory for triallyl hydrazine | 70.58 | 10.55 | 18.4 |
| Found | 70.8 | 10.6 | 18.7 |

*Example II*

Using the technique of the previous example, substantially equimolar amounts of allyl piperidine and chloramine are reacted in dioxane containing an equimolar amount of sodium hydroxide. N-allyl-N′,N′-pentamethylene hydrazine is obtained in excellent yield.

*Example III*

Two moles of dimethyl allyl amine are reacted at 20° C. with one mole of hydroxylamino-O-sulfonic acid in tertiary butanol containing 1.5 moles of potassium t-butoxide. N,N-dimethyl-N′-allyl hydrazine is obtained in good yield.

I claim as my invention:

1. Process for preparing N,N′-hydrocarbon substituted hydrazines at least one of said hydrocarbon substituents being allyl, comprising reacting an amine of the formula $$R''—\underset{H}{N}—X$$

wherein R″ is selected from the group consisting of hydrogen, alkyl and aryl having up to 8 carbon atoms and X is selected from the group consisting of halogen, —O—SO$_3$H, —O—SO$_2$C$_6$H$_5$, and $$—O—\underset{\|}{\overset{O}{C}}—CF_3$$

with a tertiary amine having from 1 to 3 N-allylic substituents $$\left(CH_2=\underset{R'}{\overset{|}{C}}—CH_2\right)—$$

wherein R′ is selected from the group consisting of hydrogen and alkyl of 1 to 3 carbon atoms with the remaining N-substituents of said tertiary amine being hydrocarbon of 1 to 8 carbon atoms, in an anhydrous basic inert organic solvent, and effecting a rearrangement with agitation and distillation at a temperature from 0 to 150° C.

2. A process according to claim 1 in which the distillation temperature is from 25° to 75° C.

3. Process according to claim 1 in which the anhydrous basic inert organic solvent is an anhydrous alcohol containing an alkali metal base.

4. Process for preparing N-allyl, N′,N′-dimethyl hydrazine by reacting chloramine with dimethyl allyl amine in a basic anhydrous inert alcoholic solvent and effecting a rearrangement by agitation and distillation at a temperature from 25° to 75° C.

5. Process for preparing N-allyl, N′,N′-diallyl hydrazine by reacting chloramine with triallyl amine in a basic anhydrous inert alcoholic solvent and effecting a rearrangement by agitation and distillation at a temperature from 25° to 75° C.

6. Process for preparing N-allyl, N′,N′-pentamethylene hydrazine by reacting chloramine with allyl piperidine in dioxane containing sodium hydroxide and effecting a rearrangement by agitation and distillation at a temperature from 25° to 75° C.

References Cited by the Examiner

UNITED STATES PATENTS 2,955,108   10/60   Omietanski _____ 260—583 XR

FOREIGN PATENTS 875,007   8/61   Great Britain.

OTHER REFERENCES

Diamond et al.: J. Am. Chem. Soc. 77, page 3131 (1955).

Noller: Chemistry of Organic Compounds (textbook), second edition, pages 241 and 264 (1957).

Yagil et al.: J. Am. Chem. Soc. 84, pages 1797–1803 (1962).

WALTER A. MODANCE, *Primary Examiner.*

JOHN D. RANDOLPH, *Examiner.*